United States Patent
Tracy et al.

(10) Patent No.: US 7,542,290 B2
(45) Date of Patent: Jun. 2, 2009

(54) COMPUTER DEVICE COOLING SYSTEM

(75) Inventors: Mark S. Tracy, Houston, TX (US); Paul J. Doczy, Houston, TX (US); Jeffrey A. Lev, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 37 days.

(21) Appl. No.: 11/527,341

(22) Filed: Sep. 26, 2006

(65) Prior Publication Data
US 2008/0074842 A1 Mar. 27, 2008

(51) Int. Cl.
H05K 7/20 (2006.01)
(52) U.S. Cl. .................. 361/696; 361/689; 361/690; 361/695; 361/697; 361/699; 174/16.1; 174/16.3; 165/80.3; 165/80.4; 165/104.33
(58) Field of Classification Search .................. None
See application file for complete search history.

(56) References Cited

U.S. PATENT DOCUMENTS

| | | | |
|---|---|---|---|
| 5,285,347 A | 2/1994 | Fox et al. | |
| 5,339,214 A | 8/1994 | Nelson | |
| 5,959,837 A | 9/1999 | Yu | |
| 6,031,721 A * | 2/2000 | Bhatia | 361/695 |
| 6,131,647 A | 10/2000 | Suzuki et al. | |
| 6,262,892 B1 * | 7/2001 | Bhatia | 361/695 |
| 6,299,408 B1 * | 10/2001 | Bhatia | 415/176 |
| 6,408,937 B1 * | 6/2002 | Roy | 165/104.33 |
| 6,460,608 B1 | 10/2002 | Katsui | |
| 6,504,718 B2 * | 1/2003 | Wu | 361/695 |
| 6,657,859 B1 | 12/2003 | Karr | |
| 6,712,129 B1 | 3/2004 | Lee | |
| 6,804,115 B2 | 10/2004 | Lai | |
| 6,867,971 B2 | 3/2005 | Lai | |
| 7,002,799 B2 * | 2/2006 | Malone et al. | 361/699 |
| 7,044,195 B2 | 5/2006 | Chen et al. | |
| 7,064,954 B1 | 6/2006 | Wu et al. | |
| 7,068,509 B2 * | 6/2006 | Bash et al. | 361/700 |
| 7,142,424 B2 * | 11/2006 | Malone et al. | 361/697 |
| 7,149,084 B2 * | 12/2006 | Matsushima et al. | 361/699 |
| 7,209,352 B2 * | 4/2007 | Chen | 361/695 |
| 7,273,088 B2 * | 9/2007 | Malone et al. | 165/80.4 |
| 7,277,282 B2 * | 10/2007 | Tate | 361/697 |
| 7,321,494 B2 * | 1/2008 | Han | 361/719 |
| 7,333,334 B2 * | 2/2008 | Yamatani et al. | 361/701 |
| 2007/0109746 A1 * | 5/2007 | Klein | 361/699 |

* cited by examiner

Primary Examiner—Boris L Chervinsky

(57) ABSTRACT

A computer device cooling system comprising a heat exchanger comprising an airflow face and a plurality of cooling fans disposed to form an airflow face, the cooling fan airflow face sized to correspond to a size of the heat exchanger airflow face.

15 Claims, 3 Drawing Sheets

COMPUTER DEVICE COOLING SYSTEM

BACKGROUND OF THE INVENTION

Computer devices, such as laptop or notebook computers, can generate high thermal loads during operation. In order to reduce or eliminate the likelihood of heat-related damage to the computer devices, cooling systems are used in the computer devices to dissipate the thermal loads. One type of cooling system comprises a flat blower fan for generating an airflow across a heat exchanger within the computer device to remove the heat that is generated by various components of the computer device. However, such blower fans require a substantial amount of space within the computer device. Furthermore, such blower fans are unable to provide an even and distributed air flow across a heat sink, heat exchanger or other heat-generating operational component to dissipate the thermal loads.

BRIEF DESCRIPTION OF THE DRAWINGS

For a more complete understanding of the present invention, and the objects and advantages thereof, reference is now made to the following descriptions taken in connection with the accompanying drawings in which.

DETAILED DESCRIPTION OF THE DRAWINGS

Figure 1:
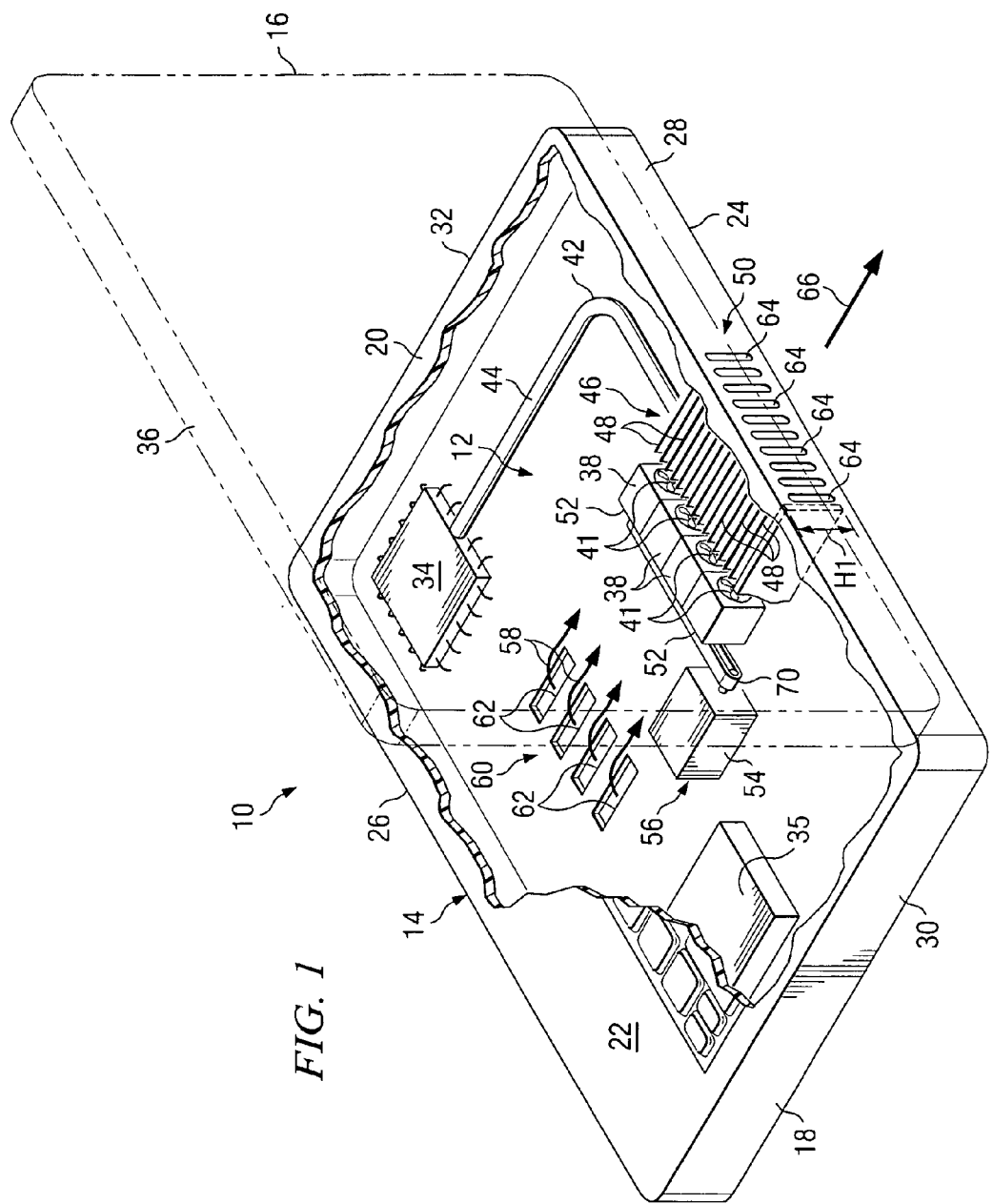
FIG. 1 is a perspective view of an interior area of a computer device in which an embodiment of a cooling system in accordance with the present invention is employed to advantage.

The preferred embodiments of the present invention and the advantages thereof are best understood by referring to FIGS. 1 and 2 of the drawings, like numerals being used for like and corresponding parts of the various drawings.

FIG. 1 is a perspective view of an interior area of a computer device 10 in which an embodiment of a cooling system 12 in accordance with the present invention is employed to advantage. According to embodiments of the present invention, cooling system 12 is configured to produce an evenly distributed and uniform cooling air flow 58 to supply a uniform distribution of airflow through a heat exchanger 46 by using minimal power and consuming minimal space within computer device 10.

In the embodiment illustrated in FIG. 1, computer device 10 comprises a notebook or laptop computer device 14 having a display member 16 rotatably coupled to a base member 18. However, it should be understood that computer device 10 may comprise any type of device, such as, but not limited to, a tablet personal computer, convertible portable computer, personal digital assistant, gaming device, or any other type of portable or non-portable computer device.

In the embodiment illustrated in FIG. 1, base member 18 comprises a housing 20 having a working surface 22, a bottom surface 24, a front surface 26, a rear surface 28 and a pair of side surfaces 30 and 32. In the embodiment illustrated in FIG. 1, cooling system 12 is disposed within housing 20 of base member 18 and is configured to dissipate and/or otherwise remove thermal energy from housing 20 generated by one or more computer operational components 34 and 35 disposed in base member 18. However, it should be understood that cooling system 12 may be otherwise located within device 10 (e.g., within a housing 36 of display member 16) and/or may be used to dissipate thermal energy generated from elsewhere in device 10 (e.g., from operational components disposed within display member 16). Computer operational components 34 and 35 may comprise a variety of different types of operational components of computer device 10 that may generate thermal loads, thereby increasing the temperature within housing 20 (e.g., a processor, graphics chip, battery, disk drive, optical drive or any other device used in operation of computer device 10).

In the embodiment illustrated in FIG. 1, cooling system 12 comprises a plurality of cooling fans 38, a heat dissipating element configured as a heat exchanger 46, and a heat transport element 42 thermally coupling at least one computer operational component 34 to heat exchanger 46. Heat transport element 42 may comprise any type of thermally conductive element capable of transferring heat from operational component 34 to heat exchanger 46. In the embodiment illustrated in FIG. 1, heat transport element 42 comprises a heat pipe 44 preferably filled with a vaporizable liquid to increase heat transfer performance. In FIG. 1, heat exchanger 46 comprises a plurality of fins 48 to facilitate thermal energy dissipation from heat exchanger 46. In the embodiment illustrated in FIG. 1, heat exchanger 46 is aligned with and/or otherwise positioned near a housing outlet 50 to facilitate cooling air flow 58 across and/or through heat exchanger 46 and discharge thereof through housing outlet 50. It should be understood that, in addition to or in lieu of heat exchanger 46, thermal energy may be dissipated by directly exposing and/or otherwise passing cooling air flow 58 over and/or past one or more of operational components 34 and 35.

In the embodiment illustrated in FIG. 1, cooling fans 38 comprise a plurality of tube axial type fans 52 disposed in an abutting relationship relative to each other with minimal or no spaces or gaps therebetween; however, it should be understood that fans 38 may be otherwise configured (e.g., fans other than that of tube axial type). Cooling fans 38 are driven and/or otherwise operated by a drive mechanism 54 to enable cooling airflow through heat exchanger 46 (e.g., across the surfaces of fins 48). In some embodiments of the present invention, fans 52 comprises motor-less tube axial type fans 52 such that drive mechanism 54 comprises a single electric motor 56 for operating all cooling fans 38; however, it should be understood that additional drive mechanisms 54 may be used to operate one or more of cooling fans 38. Further, it should be understood that one or more fans 52 may comprise a motor for driving itself and other/remaining fans 52. Thus, embodiments of the present invention contemplate utilizing a single drive mechanism 54 to operate the plurality of cooling fans 38, thereby consuming less power and requiring less space within housing 20. Thus, embodiments of the present invention enable the manufacture of small computer devices 10 while providing additional space within housing 20 for operational components therein.

In operation, cooling air 58 is drawn into housing 20 by cooling fans 38 through at least one housing inlet 60 disposed on bottom surface 24 and having a plurality of apertures 62. Cooling fans 38 create air flow 58 through housing 20 across heat exchanger 46, thereby dissipating thermal energy transferred from operational component 34 to heat exchanger 46 by heat pipe 44. In the embodiment illustrated in FIG. 1, the warmed cooling air flow 58 exits housing 20 through housing outlet 50, which comprises a plurality of apertures 64 disposed on surface 28. It should be understood that computer device 10 may comprise a greater number of heat exchangers 46 and/or outlets 50 (e.g., additional outlets to accommodate any additional heat exchangers 46). Further, it should be understood that a greater number of inlets 60 may be used and/or may be otherwise located on housing 20 (e.g., in surfaces 22, 26, 28, 30 and/or 32 in addition to or in lieu of bottom surface 24) to facilitate greater airflow distribution within housing 20. For example, providing inlets on surfaces 26, 30 and/or 32 enable a cooling air flow to additional areas of housing 20 (e.g., other than directly across heat exchanger 46, such as, for example across operational component 35) to dissipate excess thermal energy generated by the additional operational component(s) by flowing directly across the surfaces of the operational component(s). It should be understood that in such instances, the warmed cooling air flow may exit housing 20 through housing outlet 50 disposed on surface 28 (along with the warmed cooling air 58) and/or through any other outlet 50 that may be disposed on surfaces 22, 24, 26, 30 and/or 32.

In the embodiment illustrated in FIG. 1, heat exchanger 46 comprises a height H1 so as to fit within corresponding interior dimensional constraints of housing 20. According to embodiments of the present invention, cooling fans 38 comprise a height H2 (FIG. 2a) approximately equal to or less than H1 (FIG. 1) such that cooling fans 38 do not require an increased thickness of housing 20 to fit therein. In the embodiment illustrated in FIG. 1, H2 is approximately equal to H1 (i.e., equal to or slightly greater or less than H1) such that cooling air 58 that is drawn through cooling fans 38 is directed through the entire height H1 of heat exchanger 46 with minimal or no excess cooling air 58 flowing above or below heat exchanger 46, thereby more efficiently utilizing heat exchanger 46 by directing more airflow through heat exchanger 46. According to some embodiments of the present invention, cooling fans 38 are disposed adjacent to heat exchanger 46 and are oriented in a direction such that an axis of rotation of fan blades 41 of cooling fans 38, and thus, the axis or direction of intake and discharge airflows of cooling fans 38, is pointed generally in the direction of arrow 66 toward heat exchanger 46. However, it should be understood that cooling fans 38 may be otherwise oriented. In the embodiment illustrated in FIG. 1, cooling fans 38 are disposed adjacent to each other along a length of heat exchanger 46 (e.g., preferable along an entire length of heat exchanger 46) so as to enable an even and distributed cooling air flow 58 toward and across heat exchanger 46. Preferably, fans 38 are positioned adjacent to one another with minimal space therebetween to minimize and/or eliminate any gaps of air flow through heat exchanger 46.

Figure 2A:
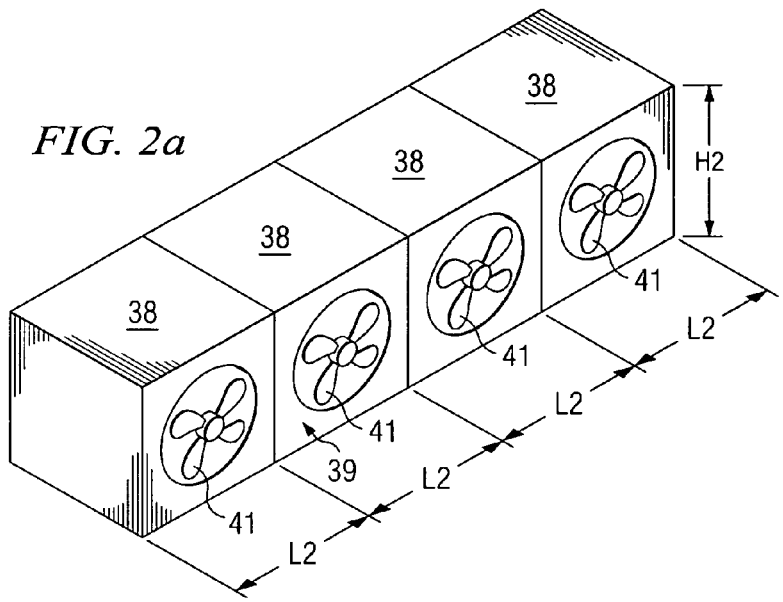
FIG. 2a is a perspective view of a cooling fan arrangement of the cooling system illustrated in FIG. 1.

FIG. 2a is a perspective view of a plurality of cooling fans 38 illustrating an airflow exhaust face 39. In the embodiment illustrated in FIG. 2a, cooling system 12 comprises four cooling fans 38 each having a length L2 and height H2. Cooling fans 38 are adjacently positioned and/or otherwise combined so as to form airflow exhaust face 39 wherein cooling air exits cooling fans 38. For example, in the embodiment illustrated in FIG. 2a, airflow exhaust face 39 comprises a total length equivalent to the lengths L2 of the four shown cooling fans 38 and having a height H2. According to embodiments of the present invention, cooling air flow 58 (FIG. 1) is evenly distributed through exhaust face 39 so as to provide a uniform distribution of airflow through exhaust face 39 and into heat exchanger 46 (FIG. 1).

Figure 2B:
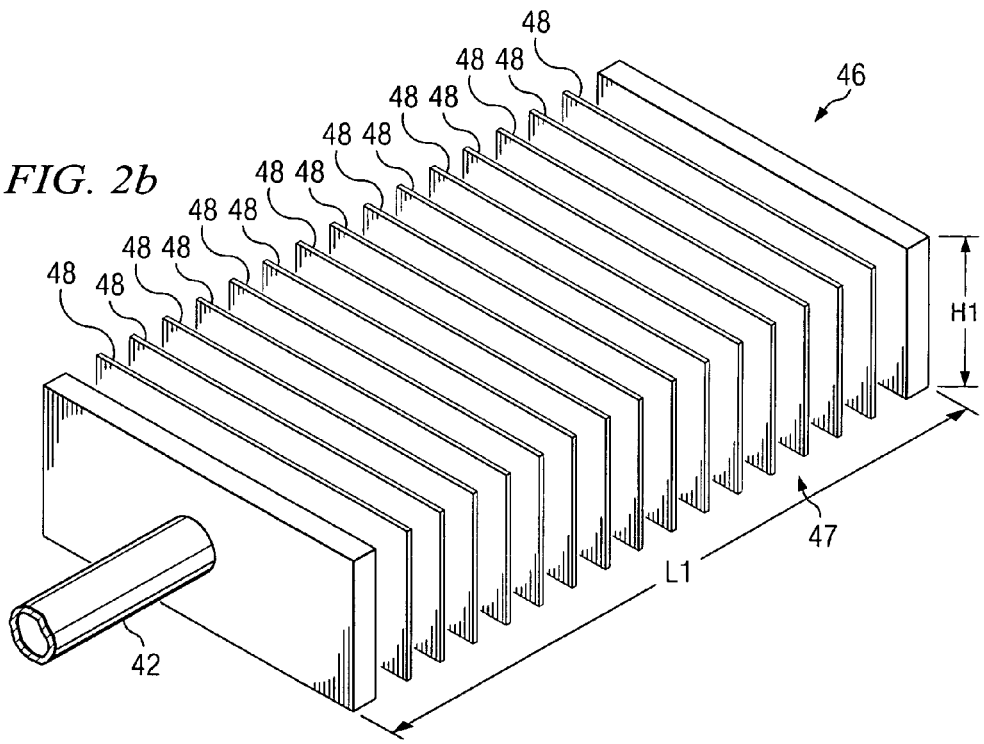
FIG. 2b is a perspective view of a heat exchanger of the cooling system illustrated in FIG. 1.

FIG. 2b is a perspective view of an airflow intake face 47 of heat exchanger 46 illustrated in FIG. 1. For purposes of illustration, heat exchanger 46 is oriented such that airflow intake face 47 faces outward (e.g., in the opposite direction illustrated in FIG. 1). In the embodiment illustrated in FIG. 2b, intake face 47 dimensionally corresponds to height H1 of heat exchanger 46 and a longitudinal length L1. In the embodiment illustrated in FIG. 2b, height H1 and length L1 are dimensioned such that the area of intake face 47 is approximately equal to (e.g., equal to or slightly greater or less than) the area of exhaust face 39 (FIG. 2a) such that cooling air 58 that is drawn through cooling fans 38 is directed through the entire height H1 and length L1 of heat exchanger 46 with minimal or no excess cooling air 58 flowing above or below heat exchanger 46. For example, referring to the embodiment of the present invention illustrated in FIGS. 2a and 2b, dimension L1 is preferably configured to correspond to N×L2 where N represents the quantity of cooling fans 38 each having a length of L2 (FIG. 2a).

Figure 3:
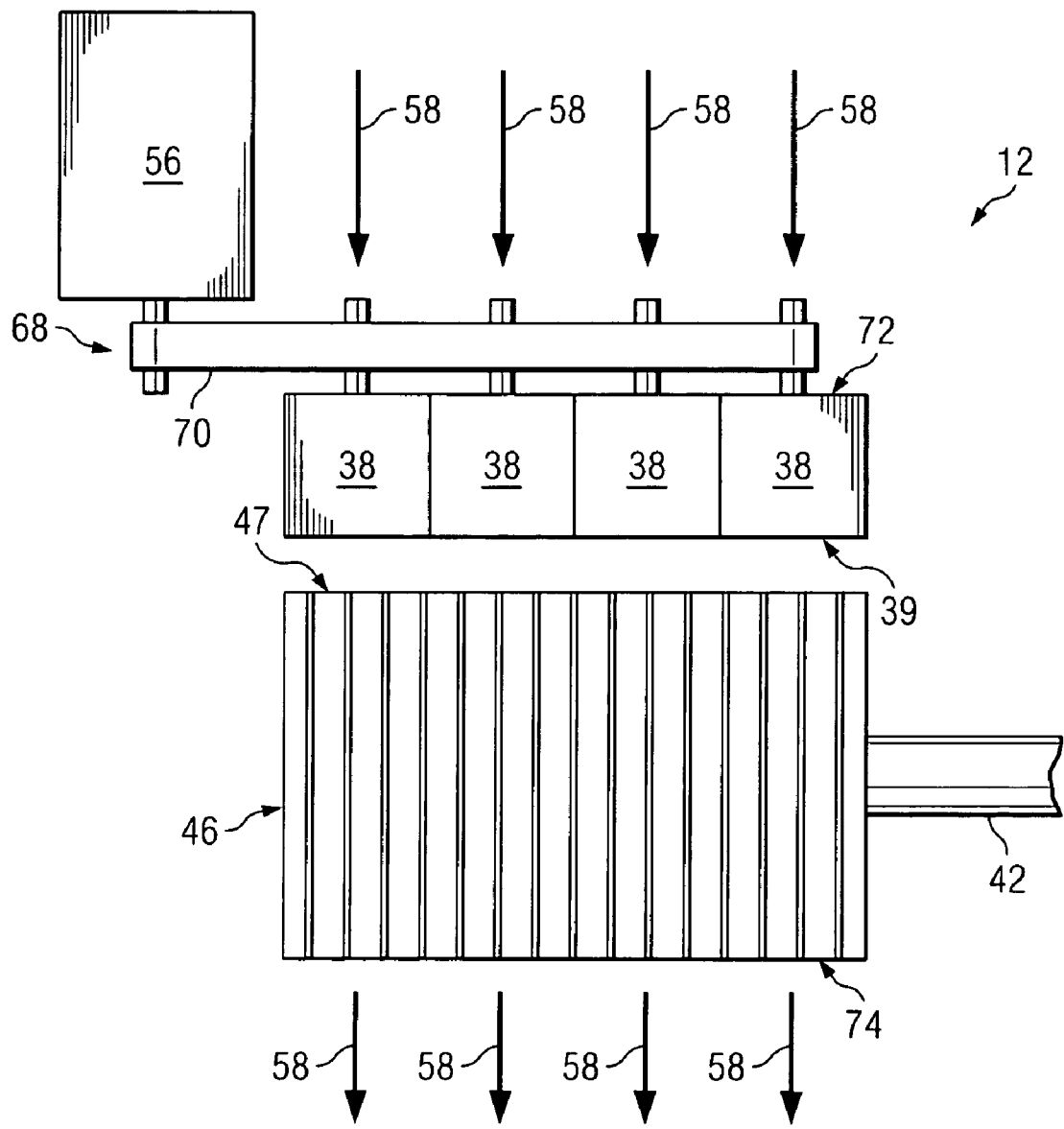
FIG. 3 is a top plan view of the cooling system illustrated in FIG. 1.

FIG. 3 is a top plan view of cooling system 12 illustrated in FIG. 1. In the embodiment illustrated in FIG. 3, cooling system 12 comprises four cooling fans 38 driven by motor 56; however, it should be understood that a greater or fewer number of cooling fans 38 may be used. In operation, cooling fans 38 provide an even and distributed cooling air flow 58 across the length of heat exchanger 46. In the embodiment illustrated in FIG. 3, exhaust face 39 is positioned such that it is in alignment with and facing intake face 47 of heat exchanger 46. However, it should be understood that cooling fans 38 may be otherwise disposed, such as for example, an airflow intake face 72 of cooling fans 38 is aligned with and otherwise facing an airflow exhaust face 74 of heat exchanger 46 such that warmed cooling air 58 is pulled through heat exchanger 46.

In the embodiment illustrated in FIG. 3, motor 56 is coupled to cooling fans 38 via a drive system 68. Preferably, cooling fans 38 comprise motor-less fan units such that a separate motor and/or drive unit is used to cause rotation of blades 41 (FIG. 1) of each fan 38. In the embodiment illustrated in FIG. 3, drive system 68 comprises a belt drive 70 in which an elastomeric belt connects each of cooling fans 38 to motor 56. It should be understood that a greater number of belts 70 may be used to connect cooling fans 38 to motor 56 and, in addition, it should be understood that other belt materials may be used, including, without limitation, metal or plastic belts. Furthermore, it should be understood that drive system 68 may comprise other methods of coupling motor 56 to cooling fans 38, such as, but not limited to, a series of gears or a combination of belts and gears.

Thus, as illustrated in FIGS. 1-3, fans 38 are preferably oriented having their blades 41 disposed in a position coplanar with outlet 50 such that blades 41 are oriented orthogonal to the direction of air flow 58 across heat exchanger 46. Further, fans 38 are preferably used having dimensional characteristics corresponding to dimensional characteristics of heat exchanger 46 (e.g., dimension H1 of heat exchanger 46) such that substantially all of the air flow generated by a particular fan 38 is directed through or across heat exchanger 46. Additionally, fans 38 are preferably used having dimensional characteristics to facilitate a linear grouping or arrangement of a plurality of fans 38 located adjacent to heat exchanger 46 and extending linearly corresponding to a longitudinal dimension of heat exchanger 46 such that substantially all of the air flow generated by the linear arrangement of fans 38 is directed through or across heat exchanger 46. Thus, some embodiments of the present invention utilize a linear series of cooling fans 38 driven by a single drive mechanism 54 to minimize the amount of space required within housing 20. Furthermore, some embodiments of the present invention utilize a linear series of cooling fans 38 adjacent to heat exchanger 46 to enable a more evenly distributed air flow across heat exchanger 46.

What is claimed is:

1. A computer device cooling system, comprising:
   a heat exchanger comprising an airflow face; and
   a plurality of cooling fans that are motor-less, tube axial, and disposed to form an airflow face, the cooling fan airflow face having a length and height sized to correspond to a length and height of the heat exchanger airflow face; and
   a single and separate drive mechanism to operate the plurality of cooling fans.

2. The cooling system of claim 1, wherein all of the plurality of cooling fans are coupled to the drive mechanism by a belt.

3. The cooling system of claim 1, wherein the plurality of cooling fans are positioned to provide a uniformly distributed air flow across the heat exchanger.

4. The cooling system of claim 1, wherein the plurality of cooling fans are positioned in an abutting relationship relative to each other.

5. The cooling system of claim 1, wherein the plurality of cooling fans are linearly arranged.

6. A method of manufacturing a computer device cooling system, comprising:
   providing a heat exchanger comprising an airflow face;
   disposing a plurality of cooling fans that are motor-less and tube axial to form an airflow face, the cooling fan airflow face having a length and height that correspond to a length and height of the heat exchanger airflow face; and
   providing a single separate drive mechanism to operate the plurality of cooling fans.

7. The method of claim 6, further comprising providing the drive mechanism that uses an elastomeric belt to operate the plurality of cooling fans.

8. The method of claim 6, further comprising coupling the plurality of cooling fans to the drive mechanism by a belt.

9. The method of claim 6, wherein the plurality of cooling fans are disposed to provide a uniformly distributed air flow across the heat exchanger.

10. The method of claim 6, further comprising disposing the plurality of cooling fans in an abutting relationship relative to each other.

11. The method of claim 6, further comprising linearly arranging the plurality of cooling fans.

12. A computer device cooling system, comprising:
    means for dissipating heat comprising an airflow face;
    a plurality of airflow means that are motor-less and tube axial for providing an airflow disposed to form an airflow face, an exhaust face of the airflow means having a length and height that are sized to correspond to a length and height of an intake face of the means for dissipating heat; and
    providing a single and separate means for driving the airflow means.

13. The cooling system of claim 12, wherein each of the airflow means is coupled to the means for driving the airflow means by a belt means.

14. The cooling system of claim 12, wherein the plurality of airflow means are disposed to provide a uniformly distributed air flow across the means for dissipating heat.

15. The cooling system of claim 12, wherein the plurality of airflow means are disposed in an abutting relationship relative to each other.

* * * * *